UNITED STATES PATENT OFFICE.

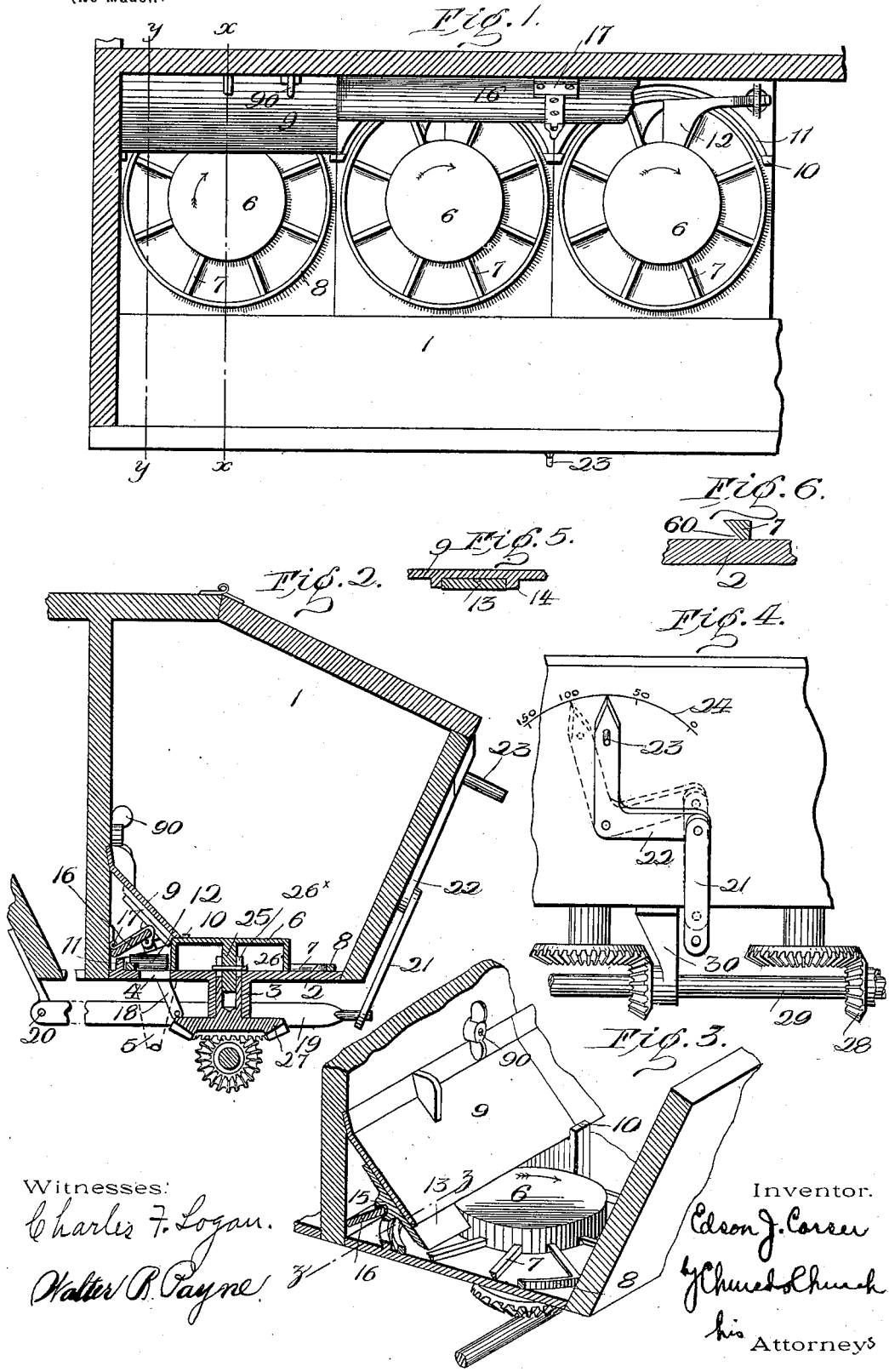

EDSON J. CORSER, OF MACEDON, NEW YORK, ASSIGNOR OF ONE-HALF TO GEORGE W. KIRKPATRICK, OF SAME PLACE.

FERTILIZER-DISTRIBUTER.

SPECIFICATION forming part of Letters Patent No. 627,983, dated July 4, 1899.

Application filed February 21, 1899. Serial No. 706,408. (No model.)

*To all whom it may concern:*

Be it known that I, EDSON J. CORSER, of Macedon, in the county of Wayne and State of New York, have invented certain new and useful Improvements in Fertilizer-Distributers; and I do hereby declare the following to be a full, clear, and exact description of the same, reference being had to the accompanying drawings, forming a part of this specification, and to the reference-numerals marked thereon.

My present invention relates to devices for feeding pulverulent material, such as fertilizer, and particularly to devices applied to grain-drills for this purpose, although capable of use for other purposes; and it has for its object to improve the construction of the feed wheel or carrier and the means for cooperating therewith to regulate the quantity fed or supplied by it; and to these and other ends it consists in certain improvements hereinafter fully described, the novel features being pointed out in the claims at the end of this specification.

In the drawings, Figure 1 is a plan view of a hopper or receptacle of a fertilizer attachment for grain-drills and embodying my improvements, portions of the shields or cover-plates being broken away to show the construction of the parts; Fig. 2, a vertical section taken on the line $x\ x$ of Fig. 1; Fig. 3, a perspective sectional view taken on the line $y\ y$ of Fig. 1; Fig. 4, a rear view of a portion of the hopper, showing the gate-adjusting devices; Fig. 5, a sectional view taken on the line $z\ z$ of Fig. 3; Fig. 6, a sectional view of one of the arms of the feed wheel or carrier.

Similar reference-numerals in the several figures indicate similar parts.

1 indicates the usual or any suitable hopper or receptacle for containing the material to be fed, said hopper being in the present instance connected to or forming part of the ordinary grain-box of a grain-drill, the bottom thereof being formed, as usual, of separate plates or sections 2, each having the central aperture surrounded by the depending tubular boss 3, and the discharge-aperture 4, arranged over the chute or tube 5. (Shown in dotted lines.)

The feed wheels or carriers arranged within the receptacle embody the central circular raised portion 6, having at the lower edge the radially-extending arms 7, the outer ends of which latter are connected by the rim or ring 8, as shown. These arms are cut away at their lower forward edges, as shown at 60, Fig. 6, and, as will be described, form a carrier for efficiently carrying the fertilizer around and allowing it to pass out of the discharge-aperture 4 in the base-plate into suitable spouts or other conducting devices. At the forward side of the hopper or receptacle is arranged an inclined cover or partition, constructed in the present instance of separate removable sections or plates 9, the upper edges being let into the side of the hopper and secured by thumb-nuts 90 and the lower edges engaging and being supported upon the lugs 10 on the ends of curved ribs 11, formed upon the bottom plates 2. The lower edges of the plates 9 extend down to the tops of the raised portion of the feed-wheels and prevent said tops from carrying the fertilizer behind the cover-plates. As the feed-wheels are rotated in the direction of the arrows the arms thereon, in connection with the ring connecting them, constituting a horizontally-movable perforated carrying portion, operate to carry the fertilizer beneath the cover-plates and around to the discharge-aperture in the bottom, through which it may be allowed to fall, or, if desired, to be more or less forcibly knocked down by the hammer or ejector 12, pivoted, as usual, upon the bottom plate and projecting over said aperture. The lower face of this hammer is beveled, and it rides upon the rim of the feed-wheel, as in Fig. 2, but is lifted by the fingers of arms 7 and allowed to drop between said arms.

The feed wheel or carrier having the arms connected at their outer ends by the rim or ring carries the fertilizer around to the discharge-orifice, as distinguished from the pushing or stirring operation accomplished by the feed-wheels heretofore in use, provided with radial arms or stirrers only. By beveling or cutting away the lower forward edges of the arms 6 fertilizer is cut out, when, as sometimes happens, it is packed solidly in the hopper, and this construction also renders the pockets formed between the arms self-clearing, as will be readily understood.

The maximum quantity of fertilizer carried around by the feed-wheel is determined by the height of the central raised portion, and in order to reduce the quantity and enable any desired amount to be fed I provide each feed-wheel with a gate 13, sliding vertically on the under side of the plates 9 and guided by flanges or lugs 14, as shown in Fig. 5, said gates being provided with lugs 15 on the lower rear side, between which projects the edge of a bar or wing 16, hinged at 17 to the side of the hopper beneath the plates 9, so that when the bar is swung on its hinge the gate will be moved up or down to allow more or less material to be moved by the wheel. This construction is simple and effective, as it allows the gates and covers, which are simple castings and do not require accurate fitting, to be readily placed in position and to be removed and repaired when desired.

All the feed-wheels and gates in the receptacle are similar, and a single bar or wing 16 is preferably provided to coöperate with all the gates, so as to operate them simultaneously, and is itself pivoted to a link 18, extending through the hopper-bottom, connected to a lever 19, pivoted at 20 to a bracket on the hopper and preferably arranged near the center of the hopper or machine. The forward end of the lever projects through an aperture in a link 21, pivoted to a bell-crank lever 22 on the rear side of the hopper, the upper end of the lever having means, as a pin 23, for operating it, and said end coöperating after the manner of an index with a scale 24, the marks of which latter preferably indicate the number of pounds of fertilizer that will be sown to the acre. As the index and scale are placed on the rear of the hopper and at or near the center thereof the operator, who walks behind the machine, can note the adjustment and vary, as desired, the quantity fed to suit the particular soil over which he is passing.

While any suitable means may be provided for operating the feed-wheels, I prefer in this instance to provide each of them with a central depending stem 25, having a cross-pin 26 and passed into a socket formed in a tubular slotted extension 26$^\times$ on the bevel-gear 27, extending up through the boss 3 in the base-plate, said gears 27 being driven by gears 28 on the feed-shaft 29, supported in brackets 30 and operated by any suitable mechanism.

It is not absolutely essential to the operation of my feed-wheel that the raised portion at the center be integral or move with the arms and ring or that it be of any particular diameter; but I prefer that it be large enough, so that the arms will have sufficient movement to carry a proper quantity of material around to the discharge-orifice in the bottom as the wheel is rotated.

As far as the broad features of the invention are concerned it is immaterial what kind of a gate is used to regulate the feed of material or where with relation to the length of the hopper the gate-operating devices are located.

By employing the single pivoted bar or wing operating all of the gates the parts are simplified and the adjustments may be readily accomplished from the center of the machine, and a single aperture in the bottom of the receptacle is required for the passage of the link 18 or similar operating device.

In the construction shown herein it will be noted that the parts are simple castings and may be readily put together without requiring special fitting or securing bolts, thereby facilitating both construction and repair.

I claim as my invention—

1. In a device for feeding pulverulent material, a rotary feed wheel or carrier embodying the raised central portion, the arms at the lower edge thereof, and the ring or rim connecting the outer ends of said arms.

2. In a device for feeding pulverulent material, the rotary feed wheel or carrier embodying the raised central portion, the arms at the lower edge thereof having the lower edges beveled or cut away, and the ring or rim connecting the outer ends of said arms.

3. In a device for feeding pulverulent material, the rotary feed wheel or carrier embodying the raised central portion, the arms at the lower edge thereof, and the ring connecting them, in combination with the movable gate for regulating the quantity of material carried by the wheel.

4. In a device for feeding pulverulent material, the rotary feed wheel or carrier having the raised central portion, the arms thereon, and the ring connecting them, in combination with a gate movable above the arms and coöperating with the side of the raised portion of the wheel.

5. In a device for feeding pulverulent material, a feed wheel or carrier having the radial arms and the ring connected to the outer ends of said arms.

6. The combination with the hopper having the aperture in the bottom, the feed-wheel having the radial arms, and the ring at the outer ends of the arms, of the ejecting-hammer extending over the arms and above the discharge-aperture, and resting upon the ring on the feed-wheel.

7. The combination with the receptacle, the feed-wheel therein having the horizontally-movable and perforated carrying portion, of the vertically-adjustable gate extending over the carrying portion of the feed-wheel.

8. The combination with the receptacle, the cover therein, the feed-wheel having the horizontally-movable and perforated carrying portion passing beneath the cover, and the central raised portion, of the vertically-movable gate extending over the carrying portion of the wheel and coöperating with the raised portion thereof.

9. The combination with the receptacle, the cover therein, and the feed-wheel having the horizontally-movable and perforated carrying portion passing beneath the cover, of the gate sliding on the cover and extending over the carrying portion of the wheel, and means located beneath the cover for actuating the gate.

10. The combination with the receptacle, the cover therein, and the feed-wheel having the horizontally-movable and perforated carrying portion passing beneath the cover, of the gate sliding on the cover and extending over the carrying portion of the wheel, and the pivoted plate arranged beneath the cover and engaging the gate.

11. The combination with the receptacle, and a series of feed-wheels operating therein, each having a horizontally-moving perforated carrying portion, of vertically-adjustable gates coöperating with said wheels, and a pivoted plate or bar engaging the gates and causing their simultaneous operation.

12. The combination with the receptacle, and a series of feed-wheels therein, having the horizontally-movable perforated carrying portions of a series of movable gates coöperating with the feed-wheels to regulate the quantity of material fed, a pivoted plate or bar engaging and operating all said gates simultaneously, and means for operating said plate.

13. The combination with the receptacle, a series of feed-wheels therein, the cover extending partially over the wheels, and the gates vertically adjustable on the cover-plate and each having the lugs or projections, of the pivoted bar arranged beneath the cover and extending between the lugs on the gates for operating them simultaneously.

14. The combination with the receptacle, the feed-wheel operating therein having the perforated carrying portion and a cover extending partially over said wheel, of a gate adjustable on the cover, a gate-operating device extending through the bottom of the receptacle, and means on the rear of the receptacle for actuating said device.

15. The combination with the receptacle, and the feed-wheel operating therein having the central raised portion and the horizontally-extending arms connected at the outer ends, of the vertically-movable gate extending from the central raised portion to the outer ends of the arms on the feed-wheel.

16. The combination with the receptacle and the cover-plate therein, having the guide-flanges on the rear side, and the gate sliding between said guides, of the feed-wheel having the horizontally-extending carrying portion and the pivoted bar beneath the cover-plate for operating the gate.

EDSON J. CORSER.

Witnesses:
W. P. WHYLAND,
HENRY ALLEN.